United States Patent [19]

Rummel et al.

[11] 3,799,149

[45] Mar. 26, 1974

[54] METABOLIC ANALYZER

[75] Inventors: John A. Rummel, Houston, Tex.;
Cortes L. Perry, Huntsville, Ala.

[73] Assignee: The United States of America as represented by the Administrator of the National Aeronautics and Space Administration, Washington, D.C.

[22] Filed: Dec. 26, 1972

[21] Appl. No.: 318,152

[52] U.S. Cl. ............... 128/2.07, 73/23, 73/421.5 R, 128/2.08
[51] Int. Cl. ............................................. A61b 5/08
[58] Field of Search ........................ 128/2.07, 2.08; 73/421.5 R, 23

[56] References Cited
UNITED STATES PATENTS

| | | | |
|---|---|---|---|
| 3,726,270 | 4/1973 | Griffis et al. | 128/2.08 |
| 2,933,082 | 4/1960 | Billin | 128/2.07 |
| 3,507,146 | 4/1970 | Webb | 73/23 |
| 2,792,828 | 5/1957 | Engelder | 128/2.07 |
| 3,659,590 | 5/1972 | Jones et al. | 128/2.08 |

Primary Examiner—Kyle L. Howell
Attorney, Agent, or Firm—L. D. Wofford, Jr.; G. J. Parter; J. R. Manning

[57] ABSTRACT

An apparatus for the measurement of metabolic rate and breathing dynamics in which inhaled and exhaled breath are sensed by sealed, piston-displacement type spirometers. These spirometers electrically measure the volume of inhaled and exhaled breath. A mass spectrometer analyzes simultaneously for oxygen, carbon dioxide, nitrogen and water vapor. Computation circuits responsive to the outputs of the spirometers, mass spectrometer, temperature, pressure and timing signals compute oxygen consumption, carbon dioxide production, minute volume and respiratory exchange ratio. A selective indicator provides for read-out of these data at predetermined cyclic intervals.

15 Claims, 3 Drawing Figures

METABOLIC ANALYZER

ORIGIN OF THE INVENTION

The invention described herein was made by an employee of the United States Government and may be manufactured and used by or for the Government of the United States of America for governmental purposes without the payment of any royalities thereon or therefor.

BACKGROUND OF THE INVENTION

This invention relates to systems for the measurement of metabolic rate and breathing dynamics of human beings and particularly to an improved system capable of simultaneously measuring and computing oxygen consumption, carbon dioxide production, minute respiratory volume, respiratory exhange ratio and lung capacity.

GENERAL DESCRIPTION OF THE PRIOR ART

Metabolic rate is generally determined in a laboratory by, first, collecting expired breath in a rubberized canvas bag for a predetermined length of time, second, measuring the volume collected, third, analyzing the gas composition of it by any of several techniques, and finally calculating the metabolic rate from the data thus obtained. This technique requires highly skilled physiological technicians to gather the data and to compute the results.

In an effort to automate such measurements, several devices have been devised. In one, a mass flow meter is employed to measure the volume of breath and a polarographic sensor is used to measure the oxygen passing through the device. It has been found that this unit is slow in response, can be used only on normal air at normal ambient pressure, is limited in its metabolic range, requires difficult maintenance, and gives poor data for resting subjects. Further, most metabolism testers operate with a fixed gas composition which the subject breathes, usually normal air or 100 percent oxygen. This, or course, limits the environment in which the tester can be used. There is also the further problem that, in general, a good metabolism tester for basal metabolism will not operate for metabolism tests wherein the subject is exercising and, generally, metabolism testers for heavily exercising subjects provide low-grade accuracy for subjects not exercising.

SUMMARY OF THE INVENTION

Accordingly, it is the object of this invention to provide a system which overcomes the problems referred to above and enables the accurate measurement of metabolic rates and breathing dynamics in varying environments and for subjects undergoing varying degrees of exertion.

In accordance with the invention, there is employed two diaphragm-sealed, piston-displacement spirometers which measure the volume of the inhaled and exhaled breath. Temperature and pressure transducers correct these volumes to the proper standard conditions. A mass spectrometer analyzes the inhaled and exhaled gases to determine their composition. This mass spectrometer analyzes simultaneously for oxygen, carbon dioxide, nitrogen and water-vapor. Pressurized bottles are employed for periodic calibration of the mass spectrometer. Logic circuitry receives signals from the spirometers and automatically refills the inhaled spirometer and empties the exhaled spirometer in exact rhythm to the user's breath. Computational circuits receive volume, temperature, pressue, gas analysis and timing signals. These signals are used to compute oxygen consumption, carbon dioxide production, minute volume and respiratory exchange ratio and the computed figures are read out at predetermined cyclic intervals.

BRIEF DESCRIPTION OF THE SYSTEM

Figure 1:
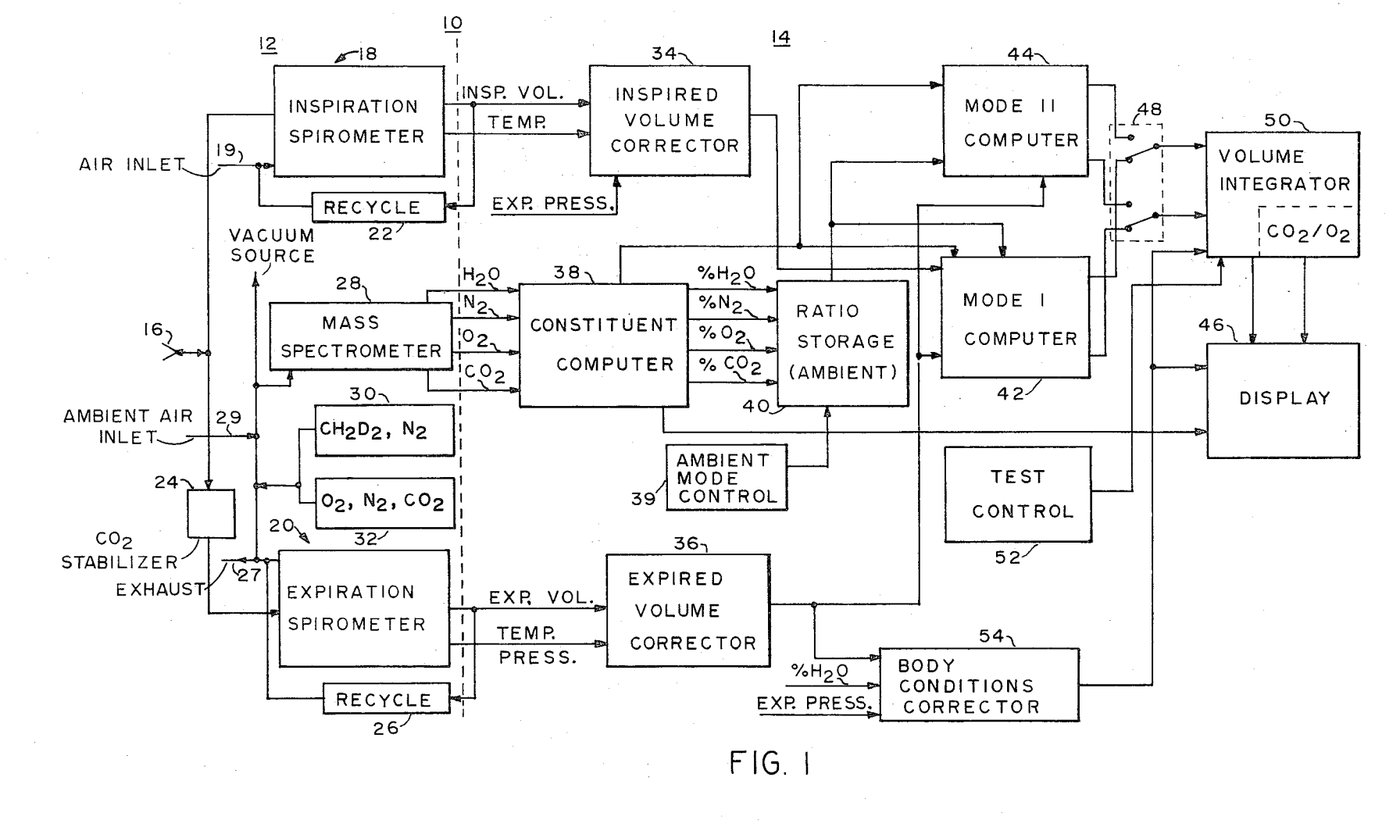
FIG. 1 is an overall block diagram of the system of this invention.

Referring to FIG. 1, metabolic analyzer 10 comprises a mechanical-chemical breath processing system 12 and electronic breath analysis system 14. A test subject interfaces with breath processing system 12 through mouthpiece 16, interconnected between inspiration spirometer 18 and expiration spirometer 20. Inspiration spirometer 18 measures the volume and temperature of air drawn in by subject through mouthpiece 16. At the end of each breath, recycle logic 22 automatically controls the refilling of inspiration spirometer 18 through intake duct 19 as air is exhaled int expiration spirometer 20 through $CO_2$ stabilizer 24. $CO_2$ stabilizer 24 assures that moisture in vapor form only is fed into spirometer 20.

Expiration spirometer 20 measures the volume, temperature and pressure of the exhaled breath. Upon the termination of each breath, recycle logic 26 automatically discharges the contents of expiration spirometer 20 through exhaust duct 27. A sample of this expired breath is drawn into mass spectrometer 28 which analyzes simultaneously for water vapor, nitrogen, oxygen and carbon dioxide, providing as outputs the atomic partial electrical signals, labeled $H_2O$, $N_2$, $O_2$ and $CO_2$, respectively. Pressurized bottles 30 and 32 contain standard mixtures of calibration gasses, as shown in FIG. 1, for periodic calibration of mass spectrometer 28.

In an ambient air mode of operation, ambient air only is selectably sampled by spectrometer 28 through ambient air inlet duct 29. The partial outputs from mass spectrometer 28 are fed to constituent computer 38 which converts partial inputs to percentage values used in computation, which are also selectably stored, by ambient mode control 39, in ambient ratio storage 40, whenever spectrometer 28 is set to monitor ambient air. This stored analysis is used by the computer for the inspired gas analysis throughout the duration of the Mode I or Mode II operation.

Pertinent gas percentage signals, as computed by constituent computer 38 following each exhaled breath are distributed to each of analog Mode I and Mode II computers 42 and 44, together with the appropriate corrected inspired and expired volume signals. The gas percentage composition signals computed by constituent computer 38 may also be selectively displayed by display 46.

Each of computers 42 and 44 compute the volume of oxygen consumed ($VO_2$) and carbon dioxide produced ($VCO_2$) during any one respiratory cycle. Both inspired and expired volume signals are utilized in Mode I computer 42 to provide measured volume computation. In the Mode II computer, only the expired volume signal is required, thus eliminating the need for an inspiration spirometer. Inspired volume is obtained within Mode II computer 44 by a determination of inert-gas-in-ambient-air method, to be further described. The outputs of either computer 42 or 44 are selectively fed through mode switch 48, and gated into volume integrator 50. In volume integrator 50, increments of respiratory cycle information are summed for a one or five minute interval, as controlled by a timer within test control 52, to obtain volume of $O_2$ consumed and $CO_2$ produced for a given time. Increments of expired volume, corrected to body conditions, by corrector 54, are similarly summed by volume integrator 50 to obtain total exhaled volume for a given time (minute volume), which may be displayed directly by display 46 to monitor volume of each exhaled breath or measure vital. $O_2$ consumed and $CO_2/O_2$ ratio, as computed by minute volume integrator 50 are also selectively displayed by display 46.

DESCRIPTION OF THE PREFERRED EMBODIMENT

Figure 2:
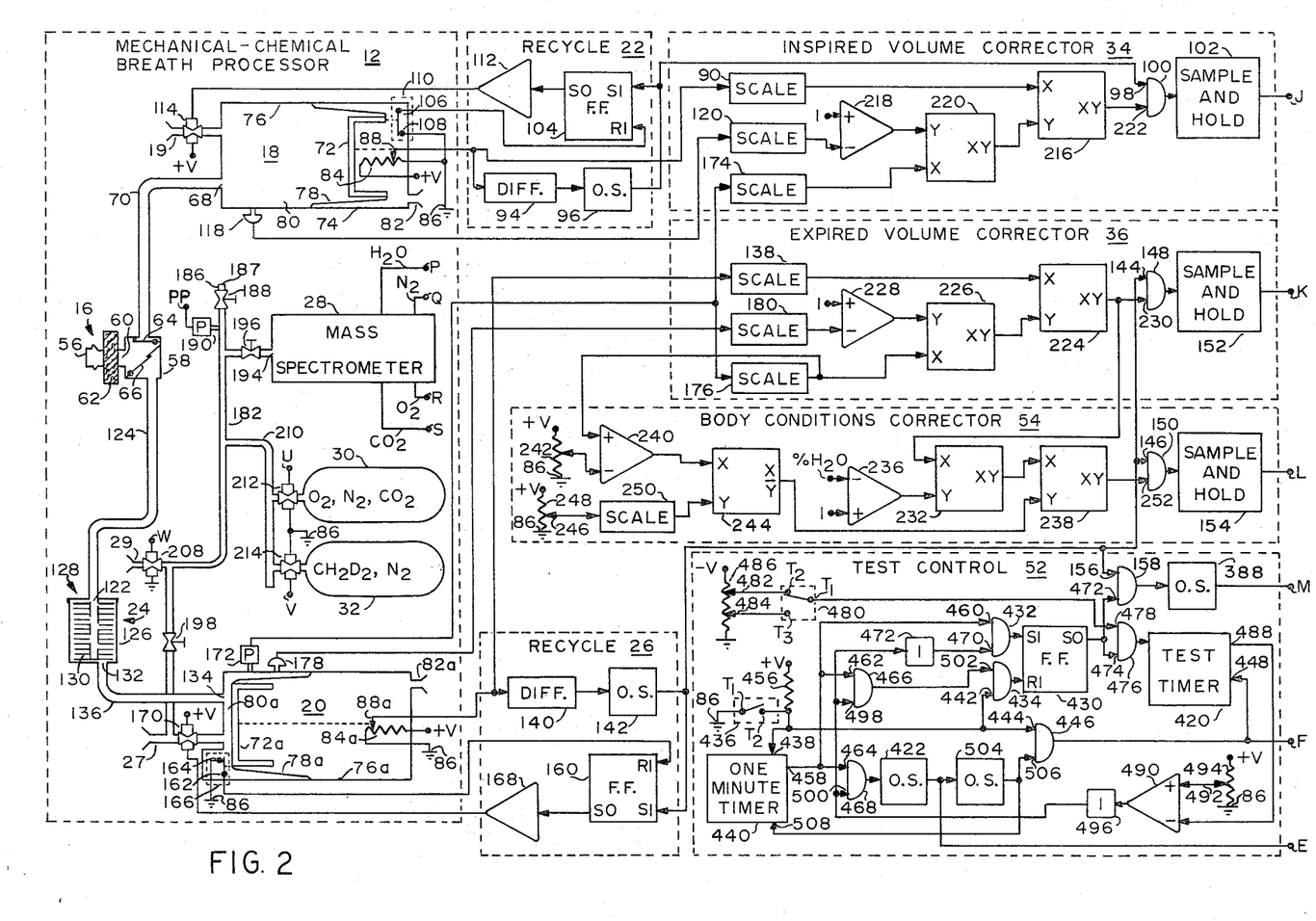
FIG. 2 is a schematic illustration showing the breath-handling portions of the system together with certain of the electrical circuitry, primarily certain test and correction circuitry.

Referring now to FIG. 2, mouthpiece 16 includes front portion 56 adapted to form a lip seal when held in the mouth of a subject under test. It communicates with valve compartment 58 through access duct 60, being equipped with replaceable moisture filter 62 which prevents liquid flow into valve compartment 58. Valve compartment 58 contains inlet valve 64 and outlet valve 66. When test subject inhales, inlet valve 64 opens and outlet valve 66 closes. As test subject exhales, inlet valve 64 closes and outlet valve 66 opens. Ambient air from a previous fill cycle is drawn from inspiration spirometer 18, through outlet duct 68 interconnected by a length of flexible hose 70 to access duct 60 by way of valve 64.

INSPIRATION SPIROMETER

Inspiration spirometer 18 comprises piston 72 coaxially supported, by means not shown, for linear movement, within enclosed cylinder 74. Piston 72 is sealed to inner wall 76 of cylinder 74 by convolute flexible diaphragm 78 adapted to provide a very low friction seal. As air is withdrawn from forward compartment 80 of cylinder 74, outside air introduced through rear vent 82 forces piston 72 forward by an amount equal to the volume of air inhaled from spirometer 18.

As piston 72 is displaced from the normal or steady state position, an inspired volume signal is generated by potentiometer 84 having end terminals connected between a positive voltage and common ground 86 and having wiper 88 mechanically linked to piston 72. A voltage indicative of the inspired volume is coupled as an input to scaling amplifier 90 of inspired volume corrector 34 and to differentiator 94 of recycle circuit 22.

Recycle circuit 22 is connected to spirometer 18 to detect termination of the inspiration cycle and control the refilling of spirometer 18 for a subsequent measurement. In operation, an inspired volume signal, in the form of a positive voltage ramp, is coupled through differentiator 94 which outputs a square wave, equivalent in time to the length of the ramp voltage, and the trailing edge of which triggers one slot 96. The output of one-shot 96 is fed to input 98 of gate 100 of sample and hold 102 of volume corrector 34 and to the set input $S_I$ of flip-flop 104, having reset input $R_I$ coupled, through nomally closed contacts 106 and 108 of limit switch 110, to common ground 86. Set output $S_O$ of flip-flop 104 is coupled to amplifier 112 which serves as a valve driver to control refill solenoid valve 114, being energized from a positive voltage source.

When solenoid valve 114 is actuated, piston 72 is returned to normal position by a constant torque return spring, not shown, as ambient air refills compartment 80 through inlet duct 19 and residual air is discharged through rear vent 82. Temperature transducer 118, attached to wall 76 of spirometer 18 measures the temperature of inhaled air, being coupled to scaling amplifier 120 of volume corrector 34. The measured volume of air inspired from inspiration spirometer 18, upon being exhaled, is passed through outlet valve 66 of mouthpiece 16 and into inlet tube 122 of $CO_2$ stabilizer 24 through a length of flexible hose 124.

$CO_2$ STABILIZER $CO_2$ stabilizer 24 is a moisture filter which does not absorb $CO_2$. $CO_2$ stabilizer 24 comprises cylindrical cannister 126 adapted to sealably receive interchangeable insert filter assembly 128, which consists of a plurality of stacked absorbent discs 130, retained about apertured inlet tube 122. The exhaled breath is dispersed outward through absorbent disc 130 within cannister 126 where moisture, in droplet form, is vaporized before passing through outlet opening 132 of cannister 126 into inlet duct 134 of expiration spirometer 20 through interconnecting pipe 136.

EXPIRATION SPIROMETER

Expiration spirometer 20 is similar in construction to inspiration spirometer 18 heretofore described, except that the piston is spring biased to the opposite position, as shown in FIG. 2. Accordingly, like components bear similar designations but with the suffix $a$. As the test subject exhales, air enters forward compartment 80$a$ of spirometer 20 forcing piston 72$a$ rearward, thus increasing the volume of compartment 80$a$ by an amount equal to the volume of the exhaled air. Ambient air is simultaneously exhausted through rear vent 82$a$. An exhaled volume signal, generated by wiper 88$a$ of potentiometer 84$a$, is fed as an input to scaling amplifier 138 of expired volume corrector 36 and to the input of differentiator 140 of recycle circuit 26.

Recycle circuit 26 is interconnected as follows to detect the termination of an expiration cycle and to control the discharge of expired gases from spirometer 20 in preparation for a subsequent measurement. The expired volume signal, in the form of a positive voltage ramp, is coupled through differentiator 140, which outputs a square wave equivalent in time to the length of the ramp voltage, and the trailing edge of which triggers one shot 142. The output of one-shot 142 is coupled as a strobe pulse to inputs 144 and 146 of gates 148 and 150, respectively, of sample and hold circuits 152 and 154, of volume corrector 36 and body conditions corrector 54, respectively, and to input 156 of gate 158 of test control 52, to be described. The output of one-shot 144 is also coupled to set input $S_I$ of flip-flop 160 having reset input $R_I$ coupled to common ground 86 through closed contacts 162 and 164 of limit switch 166. Set output $S_O$ of flip-flop 160 is coupled to the input of amplifier 168, which serves as a valve driver, to control solenoid valve 170. When solenoid valve 170 is actuated, piston 72a is returned to its normal position by a constant torque spring, not shown, as ambient air flows into spirometer 20 through rear vent 82a and the expired air is discharged through outlet duct 27.

Figure 3:
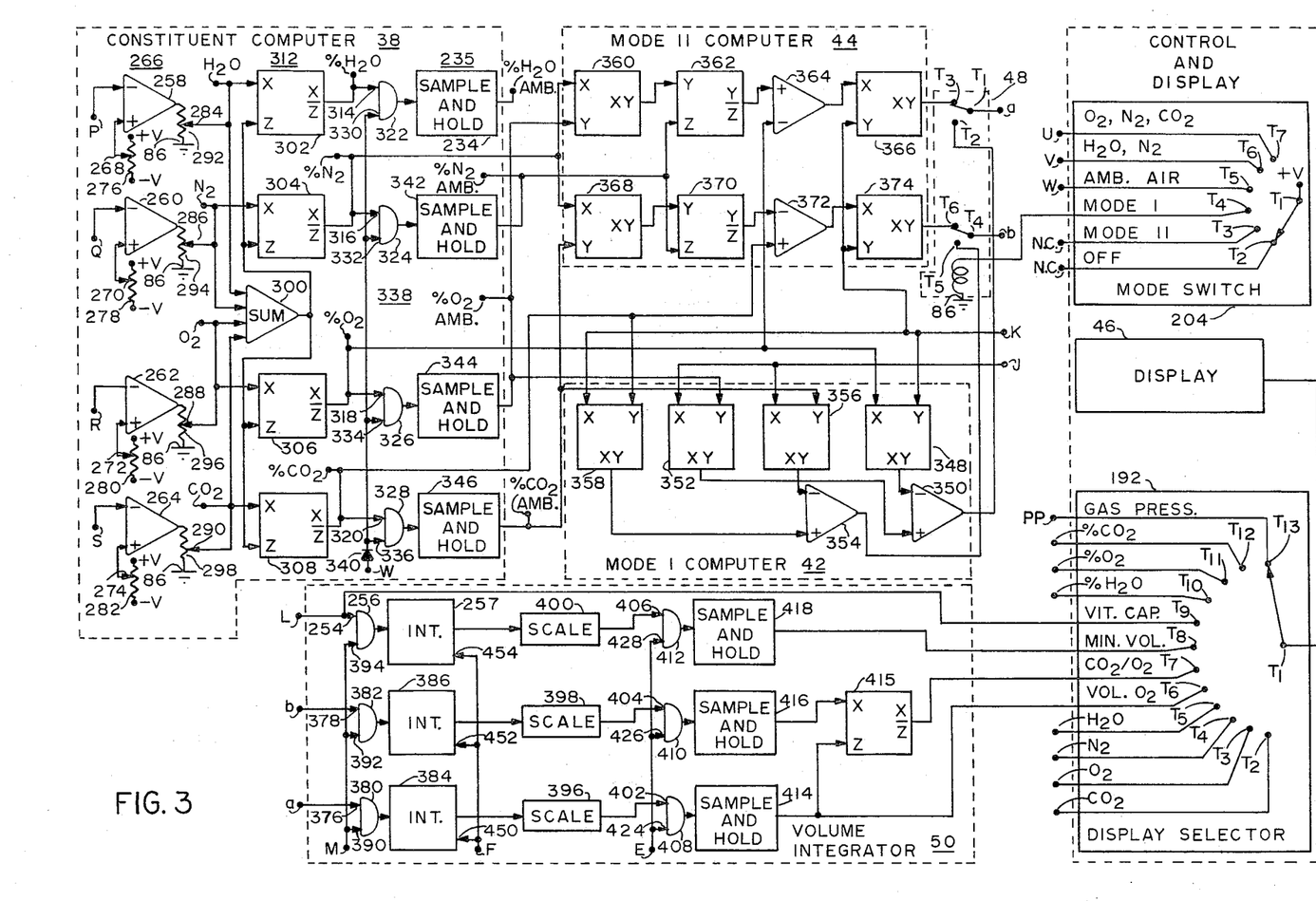
FIG. 3 is an electrical block diagram illustrating principally the computation and display circuitry of the invention.

Expiration pressure is measured by pressure sensor 172 attached to outer wall 76a, being coupled to the input of scaling amplifier 174 of inspired volume corrector 34 and as an input to scaling amplifier 176 of expired volume corrector 36, to be further described. Expiration temperature, as measured by transducer 178, also attached to wall 76a of spirometer 20, is fed to scaling amplifier 180 of expired volume corrector 36. A small sample of each exhaled breath is selectably drawn into sampling conduit 182, being coupled at the lower end, as viewed in FIG. 2, to exhaust duct 27 of expiration spirometer 20 and at upper end 186 to a vacuum source, not shown. The inner diameter of conduit 182 is selected to act as a restrictive orifice which enables the velocity of the flowing gases to be maintained at a prescribed optimum rate, by adjusting manual valve 188 positioned near upper end 186 of conduit 182. Gas velocity is indirectly indicated by pressure sensor 190, the output of which is coupled through common terminal P to contact T13 of display select switch 192 (FIG. 3). A small portion of each air sample is drawn from sample conduit 182 into mass spectrometer 28 by integral vacuum source, not shown, through inlet tube 194, provided with manual inlet control valve 196. The exhaled sample is selectably fed into sampling conduit 182 by ball valve 198. Sampling of ambient air is provided by branch inlet tube 29 coupled to sampling conduit 182 at a point intermediate ball valve 198 and inlet tube 194 being selectably controlled by solenoid valve 208 connected to common ground 86 and, through common terminal W, to contact T5 of mode switch 204 (FIG. 3).

MASS SPECTROMETER

Mass spectrometer 28 separates the pertinent constituents of the selected expired or ambient air sample into a spectrum according to their mass. The atomic masses per each molecule of gas are determined and represented by voltage outputs from spectrometer 28, bearing the chemical designations $H_2O$, $N_2$, $O_2$ and $CO_2$. These are fed to output terminals P, Q, R and S. respectively.

CALIBRATION BOTTLES

Pressurized calibration bottles 30 and 32 contain standard mixtures of calibration gases which are used for periodic calibration of mass spectrometer 28, being interconnected through branch pipe 210 to sampling conduit 182 at a point intermediate ambient inlet 29 and inlet tube 194 of spectrometer 28. Calibration gasses are selectably released into mass spectrometer 28 by solenoid valves 212 and 214, respectively, being interconnected to common ground 86 and, through terminals U and V, to contact $T_6$ and $T_7$ of mode switch 204 (FIG. 3).

VOLUME CORRECTORS

The measured volume from each of inspiration and expiration spirometers 18 and 20, respectively, is corrected to standard conditions by volume correctors 34 and 36 respectively.

INSPIRED VOLUME CORRECTOR

The inspired volume output from wiper 88 of potentiometer 84 is coupled through scaling amplifier 90 to input X of multiplier 216. Temperature of the inspired air, as measured by transducer 118, is fed through scaling amplifier 120 to the negative input of subtractor 218. The positive input of subtractor 218 is coupled to a voltage source, not shown, representing unity and is coupled to input Y of multiplier 220. Pressure of the air, as measured by pressure sensor 172 of expiration spirometer 20, is fed through scaling amplifier 174 to input X of multiplier 220. Output XY of multiplier 220 is coupled to input Y of multiplier 216. Output XY of multiplier 216 is the inspired volume corrected to standard temperature, (0°C) and pressure (760 torr), being coupled to input 222 of gate 100 of sample and hold 102.

At the termination of each inhale cycle, a gating pulse from the output of one shot 96, coupled to input 98 of gate 100 strobes this corrected inspired volume into sample and hold 102, having an output coupled through common terminal J to Mode I computer 42 (FIG. 3), to be further described. Each of measured volume correctors 34 and 36 are adapted to solve one form of Charles's Law as follows:

$$V_2 = V_1 P_1 T_2 / P_2 T_1$$

Wherein
$V_2$ = corrected volume
$V_1$ = measured volume
$P_1$ = measured pressure
$T_2$ = 0° centigrade
$P_2$ = 760 torr
$T_1$ = measured temperature The terms $T_2$ and $T_1$ are combined by scaling amplifier 120 and subtractor 218, to form a fractional multiplier, the measured temperature $T_1$ being multiplied by a conversion constant K, essentially correcting the output of transducer 118 to read absolute temperature. $P_1$ is divided by 760 torr by scaling amplifier 174. The correction formula then becomes:

$$V_2 = (1-KT_1)(P/760)V_1$$

EXPIRED VOLUME CORRECTOR

Accordingly, the expired volume from wiper 88a of potentiometer 84a of expiration spirometer 20 is coupled through scaling amplifier 138 to input X of multiplier 224 of volume corrector 36. Expiration pressure from pressure sensor 172 is coupled through scaling amplifier 176 to input X of multiplier 226. Temperature as measured by transducer 178 is fed through scaling amplifier 180 to the negative input of subtractor 228. The positive input of subtractor 228 is coupled to a voltage source, not shown, equivalent to unity and has an output coupled to input Y of multiplier 226. Output XY of multiplier 226 is coupled to input Y of multiplier 224. Output XY of multiplier 224 is the expired volume corrected to standard temperature and pressure being coupled to input 230 of gate 148 of sample and hold 152 and to input X of multiplier 232 of body conditions corrector 54. Upon the termination of each exhale cycle, a positive gating pulse from the output of one shot 142, coupled to input 144 of gate 148, strobes the corrected expired volume into sample and hole 152, being coupled through common terminal K to Mode I and Mode II computers 42 and 44 respectively, FIG. 3.

BODY CONDITIONS CORRECTOR

In order to provide an accurate measure of lung vital capacity and minute volume, the expired volume is further converted to dry conditions and further corrected in accordance with body moisture content and body temperature by body conditions corrector 54, as follows:

The percentage of water vapor (% $H_2O$) of each exhaled sample from output X/Z of divider 234 of constituent computer 38 (FIG. 3) to be described, is coupled to the negative input of subtractor 236. The positive input of subtractor 236 is coupled to a voltage source, not shown, representative of unity. The output of subtractor 236 is coupled to input Y of multiplier 232. Output XY of multiplier 232 is the corrected expired volume converted to dry conditions, being fed in input X of multiplier 238. Standard expiration pressure from the output of scaling amplifier 176 of volume corrector 36 is coupled to the positive input of subtractor 240. A fixed voltage from voltage divider 242, indicative of body moisture, typically 47 torr partial pressure of water representing water saturation at body temperature, is coupled to the negative input of subtractor 240, being coupled to input X of divider 244. Wiper 246 of bias potentiometer 248, being connected between common ground 86 and +V, is adjustably set to a voltage indicative of body temperature and is fed through scaling amplifier 250 to input Y of divider 244. Output X/Y of divider 244 is fed to input Y of multiplier 238. Output XY of multiplier 238 is the expired volume further corrected to body conditions, being coupled to input 252 of gate 150 of sample and hold 154. Upon the termination of each respiratory cycle, a pulse from the output of one-shot 142 coupled to input 146 of gate 150, strobes this corrected volume, representing vital capacity, into sample and hold 154, being connected through common terminal L to contact $T_9$ of display select 192 (FIG. 3) and to input 254 of gate 256 of integrator 257 of volume integrator 50 (FIG. 3) to be described.

CONSTITUENT COMPUTER

Referring to FIG. 3, output terminals P, Q, R, and S of mass spectrometer 28 (FIG. 2) are connected through common terminals P, Q, R and S, respectively, of constituent computer 38 to the negative inputs of zero and scaling amplifiers 258, 260, 262 and 264, respectively, hereinafter referred to as amplifiers 266. The positive inputs of amplifiers 266 are coupled to wipers 268, 270, 272 and 274, respectively, of zero adjusting potentiometers 276, 278, 280 and 282, respectively, being connected between positive and negative voltage sources. Outputs of mass spectrometer 28, designated $H_2O$, $N_2$, $O_2$ and $CO_2$ are provided by wipers 284, 286, 288 and 290 of gain adjust potentiometers 292, 294, 296 and 298, each being connected from the respective outputs of amplifiers 266 to common ground 86. Each of wipers 284, 286, 288 and 290 is coupled as one input to summing amplifier 300 and to input X of one of dividers 302, 304, 306 and 308, respectively, hereinafter referred to as dividers 312. Thus the total mass value from summing amplifier 300 is divided into each constituent value in order to determine the ratio, in percent, of each constituent with respect to the complete gaseous mass. This percentage conversion alleviates the difficulty of holding the total pressure sensed by the mass spectrometer to a constant value.

Calibrated outputs of amplifiers 266 are selectively displayed by display 46, being coupled through common terminals, also designated as $H_2O$, $N_2$, $O_2$ and $CO_2$, to contacts $T_5$, $T_4$, $T_3$ and $T_2$, respectively, of display selector or select switch 192. These outputs may be regarded as gain outputs inasmuch as their value is determined by adjustment of the effective gain of amplifiers 266 from which they are obtained. Outputs X/Z of dividers 312 are coupled to inputs 314, 316, 318 and 320 of sample gates 322, 324, 326 and 328, respectively. The second inputs 330, 332, 334 and 336 of gates 338 are connected in parallel through diode 340 and common terminal W to contact $T_5$ of mode switch 204 is positioned to the Ambient Air Mode, sample gates 338 are enabled and the percentage value of each of the constituents within ambient air is stored in sample and hold circuits 234, 342, 344, and 346, the outputs of which are designated %$H_2O$ AMB, %$N_2$ AMB, %$O_2$ AMB and %$CO_2$ AMB, respectively. The outputs of dividers 312 are selectively displayed by display 46, being coupled through terminals also designated %$H_2O$, %$O_2$ and %$CO_2$ to contacts $T_{10}$, $T_{11}$ and $T_{12}$ of display select 192.

MODE I COMPUTER

The percentage of oxygen in each exhaled sample, %$O_2$ from constituent computer 38, is multiplied by the corrected expired volume from terminal K, being coupled to inputs X and Y, respectively, of multiplier 348. Output XY of multiplier 348 is the total volume of oxygen in each expired breath, which is fed to the negative input of subtractor 350. In like manner, the percentage of oxygen in each inspired breath (%$O_2$ of Amb. from constituent computer 38) is multiplied by the corrected inspired volume, from terminal, J being connected to inputs Y and X respectively, of multiplier 352. Output XY of multiplier 352 is the total volume of oxygen in each inspired breath, which is fed to the positive input of subtractor 350. The difference between the volume of oxygen inhaled and the volume of oxygen exhaled at the output of subtractor 350, is, of course, the volume of oxygen consumed by test subject, being coupled to stationary contact $T_2$ of computer select relay 48.

The volume of carbon dioxide, $CO_2$, produced for each respiratory cycle is computed in a similar manner by the Mode I computer wherein the %$CO_2$ inhaled, (%$CO_2$ Amb.) is coupled to input Y of multiplier 356, and is multiplied by the corrected inspired volume from terminal J, coupled to input X of multiplier 356. Output XY of multiplier 356 is fed to the negative input of subtractor 354. The percentage of $CO_2$ in the exhaled sample (%$CO_2$) is coupled to input Y of multiplier 358 and is multiplied by the corrected expired volume from terminal K coupled to input X. Output XY is the volume of $CO_2$ expired and is fed to the positive input of subtractor 354. The output of subtractor 354, being the volume of $CO_2$ produced for each respiratory cycle, is coupled to stationary contact $T_5$ of computer select relay 48.

MODE II COMPUTER

Mode II computer 44 also computes the volume of $O_2$ consumed and of $CO_2$ produced but does not require a spirometer for the inspired volume measurement. The respective inspired volumes of $O_2$ and $CO_2$ are determined by computing the dilution effect of nitrogen gas in the inspired air as follows. The inspired volume factor of $O_2$ is determined by the formula:

($\%N_2$ in exhale sample) ($\%O_2$ in ambient)/$\%N_2$ ambient

The inspired volume factor of $O_2$ is computed by multiplier 360 and divider 362 wherein $\%N_2$ in this exhale sample and $\%O_2$ of ambient air are coupled to inputs X and Y respectively, of multiplier 360. Output XY of multiplier 360 is in turn connected to input Y of divider 362, output Y/Z is the inspired volume factor of $O_2$ and is coupled to the positive input of subtractor 364. In order to compute the volume factor of $O_2$ consumed, the percentage of $O_2$ in the exhale sample is coupled to the negative input of subtractor 364 being thus subtracted from the inspired volume factor of $O_2$. This difference at the output of subtractor 364 is coupled to input X of multiplier 366 and is thus multiplied by the corrected exhaled volume, coupled to input Y of multiplier 366. Output XY of multiplier 366, is the total volume of $O_2$ consumed for each respiratory cycle, being coupled to contact T3 of computer select relay 48.

The inspired volume factor of $CO_2$ is determined in like manner as follows: Inspired volume factor of $CO_2$ =

($\%N_2$ in exhale sample) ($\%CO_2$ in ambient)/$\%N_2$ ambient

This expression is solved by multiplier 368 and divider 370 wherein $\%N_2$ in exhale sample and $\%CO_2$ ambient are coupled to inputs X and Y, respectively, of multiplier 368. Output XY of multiplier 368 is in turn connected to input Y of divider 370, having input Z coupled to $\%N_2$ of ambient. The resultant quotient Y/Z at the output of divider 370, is the inspired volume factor of $CO_2$ and is fed to the negative input of subtractor 372. In order to determine the volume factor of $CO_2$ produced, this inspired volume factor is subtracted from $\%CO_2$ in the exhaled sample coupled to the positive input of subtractor 372. The output of subtractor 372 is coupled to input X of multiplier 374 and is accordingly multiplied by the corrected exhaled volume, coupled to input Y of multiplier 374. This result at output XY of multiplier 374 is the total volume of $CO_2$ produced for each respiratory cycle and is fed to contact T6 of computer select relay 48.

Data from the Mode I and Mode II computer are selectably fed through movable contacts $T_1$ and $T_4$ of relay 48 through common terminals a and b to inputs 376 and 378 of sample gates 380 and 382 of integrators 384 and 386, respectively, of volume integrator 50, described below.

VOLUME INTEGRATOR

Upon the termination of each respiratory cycle, a positive gating pulse from the output of one shot 388 of test control 52 (FIG. 2) and which is coupled through common terminal M to inputs 390, 392 and 394 of gates 380, 382 and 256, strobes cyclic volume into integrators 384, 386 and 257 of volume integrator 50. The outputs of integrators 384, 386 and 257 are coupled through scaling amplifiers 396, 398 and 400 to inputs 402, 404 and 406 of gates 408, 410 and 412 of sample and hold circuits 414, 416 and 418, respectively. At the end of a given time, either one minute or five minutes, as determined by test timer 420 of test control 52, to be described, a summation of the increments of $O_2$ consumed, $CO_2$ produced and lung volume is gated into sample and hold circuits 414, 416 and 418, respectively, by a strobe pulse from the output of one-shot 422 of test control 52, being coupled through common terminal E to inputs 424, 426 and 428 of sample gates 408, 410 and 412 respectively.

The output of sample and hold 414 is coupled to contact $T_6$ of display select 192 and to input Z of divider 415, having input X coupled to the output of sample and hold 416. Output X/Z of divider 415 is the $CO_2/O_2$ ratio being coupled to contact $T_7$ of display select 192. The output of sample and hold 418 is minute volume and is coupled to contact $T_8$ of display select 192.

CONTROL AND TIMING

The interval of a given test as well as the initiation and sequencing of events within metabolic analyzer 10 are provided by test control 52 (FIG. 2). The basic control element of test control 52 is flip-flop 430 which is set at the beginning of each test and reset at the end of a selected test interval by set and reset gates 432 and 434, being coupled to set and reset inputs $S_I$ and $R_I$, respectively, of flip-flop 430. The proper steady state condition of test control 52 is initially established by momentary reset 436, shown in the normally open position in FIG. 2, having movable contact $T_1$ connected to common ground 86. Stationary contact $T_2$ of reset switch 436 is interconnected to start input 438 of one minute timer 440, to be described, to input 442 of reset gate 434 of control flip-flop 430 and to input 444 of integrator reset gate 446. The output of integrator reset gate 446 is coupled to reset input 448 of test timer 420, to be described, and through common terminal F to reset inputs 450, 452 and 454 of integrators 384, 386 and 257, respectively, of volume integrator 50, FIG. 3.

Upon the release of reset switch 436 a positive voltage through resistor 456, applied to input 438 of one minute timer 440, starts timer 440 which generates a series of one minute pulses. A positive enable is applied to inputs 442 and 444 of gates 434 and 446, respectively. Output 458 of one minute timer 440 is connected to input 460 of set gate 432 of flip-flop 430 and to inputs 462 and 464 of gates 466 and 468 respectively. Upon the occurrence of the first one minute pulse from timer 440, control flip-flop 430 is set by the output of gate 432, having input 470 enabled by the output of inverter 472, in a manner to be described. Set output $S_o$ of control flip-flop 430 enables input 472 of gate 158 and input 474 of gate 476, being coupled to the input of test timer 420. A second input 478 of gate 476 is coupled to movable arm $T_1$ of test interval select switch 480 having stationary contacts $T_2$ and $T_3$ connected to wipers 482 and 484 of bias potentiometer 486, connected between a negative voltage and common ground 86. Output 488 of test timer 420, which is basically an integrating circuit, is fed to the negative input of amplifier 490 acting as a voltage discriminator, the positive input of this amplifier being coupled to wiper 492 of potentiometer 494 which in turn is connected between a positive voltage source and common ground 86.

The output of test timer 420 is a positive voltage ramp, the slope of which is determined by the position of interval select switch 480. When switch 480 is in the position shown in FIG. 2, a high bias is applied to input 478 of gate 476 and the voltage ramp at output 488 of timer 420 exceeds the bias applied to the positive input of amplifier 490 after an interval of fifty seconds. When switch 480 is in the opposite or five minute test position, a low bias voltage is applied to input 478 of gate 476 and the output ramp exceeds the positive bias voltage after an interval of four minutes and fifty seconds. At the end of either fifty seconds or four minutes and fifty seconds, depending upon the selected test interval, the output of voltage discriminator 490 drops sharply negative. This negative pulse is coupled through inverter 496 as a positive enable pulse to inputs 498 and 500 of gates 466 and 468 respectively, and, through a second inverter 472, as a negative inhibit pulse to input 470 of start gate 432. When the next sequential one minute pulse occurs at output 458 of one minute timer 440, the output of gate 466, being coupled to input 502 of reset gate 434, resets control flip-flop 430. Set output SO of flip-flop 430 applies an inhibit pulse to inputs 472 and 474 of gates 158 and 476, respectively. The output of gate 468 triggers series-connected one shots 422 and 504. The output of one-shot 422 is coupled through common terminal E, to inputs 424, 426 and 428 of gates 408, 410 and 412 of sample and hold circuits 414, 416 and 418, respectively, FIG. 3. The output of series one-shot 504 is coupled to input 506 of gate 446 and to stop input 508 of one minute timer 440. The trailing edge of the output pulse from one-shot 504 stops one minute timer 440. The output of nand gate 446 applies a reset pulse to reset input 448 of test timer 420 and to reset inputs 450, 452 and 454 of integrators 384, 386 and 257, respectively, of volume integrator 50 (FIG. 3) to complete a test cycle.

OPERATION OF SYSTEM

The system herein described is capable of performing metabolic analysis wherein a person under test is breathing normal room air or gas compositions up to and including pure oxygen. Further, measurements may be made on subjects in varying degrees of physical conditioning while at rest or performing standardized work functions up to maximum physical capacity, in either a closed or open environment whether in normal gravity or zero gravity.

In the following description it is assumed that the system is adapted to be used in a closed environment such as the cabin of a space vehicle or closed earth chamber, not shown, wherein the ambient atmosphere is maintained within limits suitable for breathing and the total pressure within the chamber being variable from 3 to 20 pounds-per-square-inch absolute.

Before actual tests are performed, and in order to verify that constituent computer 38 is properly calibrated, the following calibration check should be performed. Reference is made to FIGS. 2 and 3. After making suitable utility connections and applying power, vacuum and pressure, valve 188 of sample conduit 182 is opened and valve 196 of inlet tube 194 of mass spectrometer 28 is opened. Next, position mode switch 204 to $O_2$, $N_2$, $CO_2$ position. Power is then applied through contact $T_7$ of mode switch 204 and through common terminal U to actuate solenoid valve 212 of calibration bottle 30, allowing gas under pressure to flow into spectrometer 28. This gas is typically composed of 55 percent oxygen, 30 percent nitrogen and 15 percent carbon dioxide but may have other compositions to simulate the exhaled breath under the condition in which the test is being performed. After adjusting the pressure using valve 188, rotate display select 192 to each of gain $CO_2$, $O_2$, $N_2$ and $H_2O$ positions to verify prescribed readings at outputs of scale and adjust amplifiers 264, 262, 260 and 258, respectively, of constituent computer 38. Then position display select 192 to each of $\%O_2$, $\%CO_2$ and $\%H_2O$ positions to verify the proper percent output readings of dividers 306, 308 and 302 respectively. This test may also be performed to measure the percentage composition of the calibration gas chosen for the conditions of the test after the calibration is verified. Next set mode switch 204 to the $H_2O$-$N_2$ position. Power is thus applied through contact $T_6$ of switch 204 and common terminal 'V' to activate solenoid valve 214 of calibration bottle 32 typically containing 20 percent $CH_2D_2$ and 80 percent $N_2$. Position display select switch 192 to $\%H_2O$ position and verify the prescribed reading at the output of scale and adjust amplifier 258. An independent experiment provides the relationship of $\%H_2O$ which corresponds to the $\%CH_2D_2$ being used to calibrate for $H_2O$. Calibration having been completed, mode switch 204 is turned to "off" position to stop flow of calibration gasses into mass spectrometer 28. During the foregoing procedure, it is assumed that a vacuum condition is coupled to outlet opening 187 of sampling conduit 182 or that, when system is utilized in a space vehicle, sampling conduit 182 is vented to the vacuum of outer space.

In order to prepare the system for metabolic measurements, an exercise protocol is selected and the mode of operation is decided upon. In general, when a test subject is performing standardized exercise during a test, the shorter testing time of one minute is selected. Prior to beginning a test, mode switch 204 is always set to an ambient air mode. This applies power through contact $T_5$ of mode switch 204 and common terminal W to parallel connected inputs 330, 332, 334 and 336 of sample gates 338 of sample and hold circuits 235 of constituent computer 38. Power is also applied through common terminal W to actuate solenoid valve 208 of ambient air inlet tube 29 of spectrometer sampling conduit 182. Ambient air is then drawn into mass spectrometer 28, wherein it is analyzed and the gas percentage values of constituents are stored in sample and hold circuits 235 when the mode select switch is moved to another position.

Assuming it is desired to perform a one minute test while utilizing the Mode I computer and test subject is performing an exercise, then the test is set up and conducted as follows:

Switch 204 is set in a Mode I position. Power is applied through contact $T_4$ of mode switch 204 to computer select relay 48 which provides outputs from Mode I computer 42.

Next, time switch 480 is set to the one minute position as shown in FIG. 2, which applies high bias to input 478 of test timer 488. Then display select switch 192 is set at a "Gas Pressure" position and ball valve 198 is opened. Valve 188 of sampling conduit 182 is adjusted for optimum velocity of sampled gasses, as indirectly measured by pressure sensor 190, being coupled through common terminal PP to contact $T_{13}$ of display select switch 192.

In order to flush unwanted air from inspiration and expiration spirometers 18 and 20, respectively, subject dons mouthpiece 16 in an obvious manner and begins to breath normally. Upon inhaling, air is inspired from inspiration spirometer 18 through flexible hose 70 and inlet valve 64. As subject exhales, air is pushed through outlet valve 66, as inlet valve 64 closes, pushing air through flexible hose 124 and $CO_2$ stabilizer 24 into expiration spirometer 20. At the termination of each inhale cycle, inspiration spirometer 18 is refilled with ambient air by recycle logic 22 in a manner previously described. At the termination of each exhale cycle, the expired breath within expiration spirometer 20 is released through outlet duct 27. When ready to begin the test, subject pushes reset switch 436 of test control 52. This resets flip-flop 430 through nand gate 434, and resets test timer 420 and integrators 257, 386 and 384 of volume integrator 50 (FIG. 3) through nand gate 446.

When reset switch 436 is released, a positive voltage from contact $T_2$, applies a start signal to input 438 of one minute timer 440 and this enables inputs 442 and 444 of gates 434 and 446. Test subject now begins the required exercise and continues the normal respiratory cycle. The one minute test is initiated when flip-flop 430 is set upon the occurrence of a subsequent one minute pulse, being coupled from output 458 of timer 440 to input 460 of set gate 432.

"Set" output SO of flip-flop 430 enables inputs 472 and 474 of gates 158 and 476, respectively. High bias voltage from wiper 482 of potentiometer 486 is fed to input 478 of gate 476 of test timer 420. Output 488 of timer 420 rises in a positive direction, initiating a 50 second integration period.

The volume of each inspired breath is measured by inspiration spirometer 18, corrected to standard conditions by inspired volume corrector 34, then gated by a pulse from one shot 96 of recycle logic 22 into sample and hold 102, being coupled through common terminal J to appropriate inputs of the Mode I computer 42 (FIG. 3). In like manner the volume of each expired breath is measured by expiration spirometer 20, corrected to standard conditions by expired volume corrector 36 and gated by a pulse from one shot 142 of recycle circuit 26, into sample and hold circuit 152, being coupled through common terminal K to appropriate inputs of Mode I and Mode II computers 42 and 44, respectively (FIG. 3).

During each inhale cycle, most of the air from expiration spirometer 20 is discharged into the ambient environment through exhaust duct 27 of expiration spirometer 20, only a small quantity of each exhaled breath being drawn through sampling conduct 182 into mass spectrometer 28 (FIG. 2). Each air sample is analyzed and the pertinent gasses, $H_2O$, $N_2$, $O_2$ and $CO_2$ are separated according to their atomic mass and coupled through common terminals P, Q, R and S, respectively, to constituent computer 38 (FIG. 3). Within constituent computer 38, these quantitative values are converted to percentages with respect to the total gaseous samples in a manner heretofore described. Each fractional percentage value, when multiplied by the corrected inspired or expired volume, results in a volumetric percentage value for that gas relative to the total volume of the inspired or expired gasses.

The corrected exhaled volume signal at output XY of multiplier 224 of expired volume corrector 36 is further corrected to body conditions by body conditions corrector 54 being gated by a pulse from one shot 142 of recycle 26 into sample and hold 154. The output of sample and hold 154 is fed through common terminal L to input 254 of gate 256 of volume integrator 50 and to stationary contact $T_9$ of display select 192. Thus the corrected volume of each exhaled breath may be displayed, when so desired, as vital capacity.

A computation of the volume of $O_2$ consumed and $CO_2$ produced is made by each of computers 42 and 44, Mode I computer 42 by the measured volume method and Mode II computer 44 by the nitrogen dilution technique. The resultant volumes of $O_2$ consumed and $CO_2$ produced from Mode I computer 42 are coupled to contacts $T_2$ and $T_5$, respectively, of computer select relay 48.

In the Mode I test described above, since switch 204 is in the "Mode I" position, the resultant cyclic computed volumes of $O_2$ consumed and $CO_2$ produced, are coupled through movable contacts $T_1$ and $T_4$ of computer select relay 48 and common terminals a and b to inputs 376 and 378 of gates 380 and 382, respectively, of volume integrator 50. At the termination of each respiratory cycle, the computed volumes are then gated into integrators 384 and 386 by a strobe pulse from the output of one shot 388 of test control 52. Simultaneously, the corrected volume of each exhaled breath is gated into integrator 257. Accordingly, integrators 384, 386 and 257 provide a summation of the increments of volume for the selected testing time of one minute and have outputs connected through scaling amplifiers 396, 398 and 400 to inputs 402, 404 and 406 of sample and hold circuits 414, 416 and 418, respectively. When an interval of fifty seconds has elapsed, the voltage ramp at output 488 of test timer 420 exceeds the bias voltage at the positive input of voltage discriminator 490, causing a steep negative drop at the output of discriminator 490 producing a positive pulse at the output of inverter 496, enabling inputs 498 and 500 of nand gates 466 and 468, respectively. The output of series connected inverter 472 inhibits input 470 of set gate 432.

The foregoing test is completed after a one minute interval when the next sequential pulse from output 458 of one minute timer 440, is fed to inputs 462 and 464 of gates 466 and 468, respectively. The output of gate 466 resets flip-flop 430 through input 502 of reset gate 434, inhibiting inputs 472 and 474 of gates 158 and 476, respectively, being coupled to set output SO. The output of gate 464 triggers series connected one shots 422 and 504. A three tenths millisecond pulse from the first one shot 422, being coupled through common terminal E to inputs 424, 426 and 428 of sample gates 408, 410 and 412, respectively (FIG. 3) strobes accumulated volume information from integrators 384, 386 and 257 into sample and hold circuits 414, 416 and 418, respectively. The similar output of one shot 504 is coupled to input 506 of nand gate 446 and to stop input 508 of one minute timer 440. A reset pulse from one shot 504 is coupled through gate 446 to reset input 448 of test timer 420 and through common terminal E to reset inputs 450, 452 and 454 of integrators 384, 386 and 257 (FIG. 3). One minute timer 440 is stopped by the trailing edge of this reset pulse from one shot 504.

The desired metabolic test results may now be read out by positioning display select switch 192 to any one of indicated positions $O_2$, $CO_2/O_2$ ratio or minute volume, which displays information previously stored in sample and hold circuits 414, 416 and 418 of volume integrator 50.

A similar sequence of events occur when performing a five minute analysis, the only difference being that test switch 480 FIG. 2) is operated to the low bias position.

When performing a test using the Mode II computer, no connection is made to contact $T_3$ of mode switch 204, however, data from the Mode II computer are connected through contacts $T_1$ and $T_4$ of computer select relay 48. Although for the purpose of illustration one and five minute test were described, other test intervals, as desired are enabled by an appropriate adjustment of wipers 482 and 484 of bias potentiometer 486 (FIG. 2).

What is claimed is:

1. A metabolic analyzer for measurement of a subject's metabolic rate by respiratory gas analysis, said metabolic analyzer comprising:
    inspiration spirometer means adapted to sense and measure the volume of a subject's inhaled breath and provide a voltage signal output indicative of said volume;
    expiration spirometer means adapted to sense and measure the volume of a subject's exhaled breath and provide a voltage signal output indicative of said volume of exhaled breath;
    means for receiving a sample of the exhaled breath sensed and measured by said expiration spirometer means and providing a voltage signal output indicative of the proportion of $CO_2$ in the subject's exhaled breath;
    means for receiving a sample of the ambient air being breathed by said subject and providing a voltage signal output indicative of the proportion of $CO_2$ in said ambient air;
    computation means responsive to said voltage signal outputs for computing the volume of the $CO_2$ produced by said subject during a specific time interval;
    control means responsive to the completion of an expired breath as sensed by said expiration spirometer means to commence said time interval for computation and for controlling said computation means to compute the volume of $CO_2$ produced by said subject during said time interval; and
    indication means responsive to said computation means for indicating the computation performed by said computation means.

2. A metabolic analyzer as set forth in claim 1 further comprising $CO_2$ stabilizing means connected to said expiration spirometer means for passing moisture in vapor form only into said expiration spirometer means.

3. A metabolic analyzer as set forth in claim 1 including recycle logic means connected to each of said spirometer means for providing a discrete voltage at the completion of an inhalation and an exhalation, for controlling a said spirometer means whereby an operating cycle of each said spirometer means is commenced upon the occurrence of a said discrete voltage for that spirometer means.

4. A metabolic analyzer as set forth in claim 1 wherein:
    said means for receiving a sample of exhaled breath further comprises means for providing a voltage signal output indicative of the proportion of $O_2$ in said exhaled breath:
    said means for receiving a sample of ambient air being breathed by said subject further comprising means for providing a voltage signal output indicative of the proportion of $O_2$ in ambient air; and
    said computation means is further responsive to said voltage signal output indicative of the proportion of $O_2$ in exhaled breath and in ambient air for computing the volume of $O_2$ consumed during a said time interval.

5. A metabolic analyzer as set forth in claim 1 wherein said indication means includes means responsive to said expiration spirometer means for selectively indicating the volume of a said exhaled breath.

6. A metabolic analyzer as set forth in claim 4 wherein said means for receiving a sample of the exhaled breath further comprises means for providing a voltage output signal indicative of the proportion of $H_2O$ in the subject's exhaled breath and said indication means is further responsive to said means for receiving a sample of exhaled breath for selectively indicating the proportions of $H_2O$, $CO_2$ and $O_2$ in the exhaled breath.

7. A metabolic analyzer as set forth in claim 6 wherein said means for receiving a sample of ambient air being breathed further comprises means for providing a voltage output signal indicative of the proportion of $H_2O$ in the subject's exhaled breath and said indication means is further responsive to said means for receiving a sample of ambient air being breathed for selectively indicating the proportions of $H_2O$, $CO_2$ and $O_2$ in the ambient air.

8. A metabolic analyzer as set forth in claim 7 further comprising calibration means including a source of $CH_2D_2$ (dideuteromethane) diluted with $N_2$ to have the apparent properties of water vapor and including means for coupling said source to said means for receiving samples of ambient air, whereby said indication means may be calibrated in terms of water vapor.

9. A metabolic analyzer as set forth in claim 8 wherein the percentage of said $CH_2H_2$ is 20% and $N_2$ is 80%.

10. A metabolic analyzer as set forth in claim 8 wherein:
    said means for receiving a sample of ambient air being breathed by a subject includes means for providing a voltage signal output indicative of the precentage of $N_2$; and
    said analyzer further comprises calibration means for selectively providing a known mixture of $N_2$, $O_2$ and $CO_2$ as a substituted input to said means for receiving samples of ambient air,
    whereby said indication means may be calibrated to indicate the percentage of $N_2$, $O_2$ and $CO_2$ to correspond to the known percentages of each present in said source.

11. A metabolic analyzer as set forth in claim 10 wherein inspiration spirometer means comprises:

a cylinder having a closed end;
a piston positioned for travel within said cylinder;
a convoluted, flexible diaphragm coupling and providing a seal between said piston and said cylinder;
breath input means for coupling ambient air from the compartment in said cylinder formed between said piston and said closed end to a subject; and
potentiometer means mechanically coupled to said piston for providing an output voltage proportional to the displacement of said piston from a preselected position,
whereby the movement of said piston caused by an inspired breath is electrically sensed by said potentiometer and said output voltage is fed to said computation means.

12. A metabolic analyzer as set forth in claim 11 wherein said expiration spirometer means comprises:
a second cylinder having a closed end;
a piston positioned for travel within said second cylinder;
a convoluted flexible diaphragm coupling and providing a seal between said last named piston and said second cylinder;
breath output means adapted to couple breath exhaled by a subject to the compartment in said second cylinder formed between said last named piston and said last named closed end; and
potentiometer means mechanically connected to said last named piston for providing to said computation means an output voltage proportional to the displacement of said last named piston from a selected position.

13. A metabolic analyzer for measurement of metabolic rate by respiratory gas analysis, said metabolic analyzer comprising:
expiration spirometer means adapted to sense and measure the volume of a subject's exhaled breath and provide a voltage signal output indicative of the volume of exhaled breath;
means for receiving a sample of the exhaled breath sensed and measured by said expiration spirometer means and providing voltage signal outputs indicative of the porportion of $O_2$ and $N_2$, respectively, in the subject's exhaled breath;
means for receiving a sample of the ambient air being breathed by said subject and providing voltage signal outputs indicative of the proportion of $O_2$ and $N_2$, respectively, in said ambient air;
computation means responsive to said voltage signal outputs for computing the volume of the $O_2$ consumed by said subject during a specific time interval;
control means responsive to the completion of an expired breath as sensed by said expiration spirometer means to commence said time interval for computation and for controlling said computation means to compute the volume of $O_2$ consumed by said subject during said time interval; and
indication means responsive to said computation means for indicating the volume of $O_2$ consumed by subject during said time interval.

14. A metabolic analyzer for measurement of metabolic rate by respiratory gas analysis, said metabolic analyzer comprising:
expiration spirometer means adapted to sense and measure the volume of a subject's exhaled breath and provide a voltage signal output indicative of the volume of exhaled breath;
means for receiving a sample of the exhaled breath sensed and measured by said expiration spirometer means and providing voltage signal outputs indicative of the proportion of $CO_2$ and $N_2$, respectively, in the subject's exhaled breath;
means for receiving a sample of the ambient air being breathed by said subject and providing voltage signal outputs indicative of the proportion of $N_2$ and $CO_2$, respectively, in said ambient air;
computation means responsive to said voltage signal outputs for computing the volume of the $CO_2$ produced by said subject during a specific time interval;
control means responsive to the completion of an expired breath as sensed by said expiration spirometer means to commence said time interval for computation and for controlling said computation means to compute the volume of $CO_2$ produced by said subject during said time interval; and
indication means responsive to said computation means for indicating the volume of $CO_2$ produced by subject during said time interval.

15. A metabolic analyzer for measurement of metabolic rate by respiratory gas analysis, said metabolic analyzer comprising:
expiration spirometer means adapted to sense and measure the volume of an exhaled breath and provide a signal output indicative of said volume of exhaled breath;
mass analysis means for receiving a sample of ambient air being breathed and a sample of exhaled breath sensed by said expiration spirometer means and providing signal outputs comprising outputs representative of proportions of chemical constituents in said samples including the proportion of one constituent from the group of $O_2$ and $CO_2$ in each sample;
computation means responsive to said outputs of said mass analysis means and expiration spirometer means for computing the volume of one of the signs of metabolic rate from the group consisting of $O_2$ consumed and $CO_2$ produced by a subject during a specific time interval;
control means responsive to the completion of an expired breath as sensed by said expiration spirometer means to commence said time interval for computation and for controlling said computation means to compute the volume of at least one of said signs of metabolic rate during said time interval; and
indication means responsive to said computation means for indicating the said volume computed by said computation means.

* * * * *